(12) United States Patent
Huang et al.

(10) Patent No.: US 8,702,293 B2
(45) Date of Patent: Apr. 22, 2014

(54) LIGHT GUIDE PLATE AND BACKLIGHT MODULE

(75) Inventors: Jianfa Huang, Shenzhen (CN); Poying Lin, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 498 days.

(21) Appl. No.: 12/997,473

(22) PCT Filed: Nov. 26, 2010

(86) PCT No.: PCT/CN2010/079205
§ 371 (c)(1),
(2), (4) Date: Dec. 10, 2010

(87) PCT Pub. No.: WO2012/058833
PCT Pub. Date: May 10, 2012

(65) Prior Publication Data
US 2012/0113677 A1    May 10, 2012

(30) Foreign Application Priority Data
Nov. 5, 2010   (CN) .......................... 2010 1 0536818

(51) Int. Cl.
*F21V 7/04*   (2006.01)

(52) U.S. Cl.
USPC ........... 362/607; 362/600; 362/606; 362/235; 362/613

(58) Field of Classification Search
USPC ........ 362/600, 606, 612, 613, 527, 231, 235, 362/607
See application file for complete search history.

(56) References Cited

U.S. PATENT DOCUMENTS

| | | | | |
|---|---|---|---|---|
| 7,717,600 | B2* | 5/2010 | Lim et al. | 362/606 |
| 8,434,809 | B2* | 5/2013 | Young et al. | 296/70 |
| 2006/0291252 | A1 | 12/2006 | Lim et al. | |

FOREIGN PATENT DOCUMENTS

| | | |
|---|---|---|
| CN | 2375978 Y | 4/2000 |
| CN | 2594812 Y | 12/2003 |
| CN | 1519624 A | 8/2004 |
| CN | 10102517 A | 8/2007 |
| CN | 101140335 A | 3/2008 |
| CN | 10625076 A | 1/2010 |
| CN | 101750668 A | 6/2010 |
| CN | 101806978 A | 8/2010 |

* cited by examiner

*Primary Examiner* — Anabel Ton

(57) ABSTRACT

The present invention provides a light guide plate and a backlight module, wherein the light guide plate comprises a bottom surface, a light incident surface and a light-emitting surface. The light-emitting surface and the bottom surface are positioned oppositely. The bottom surface comprises a plurality of screen dots. The screen dots comprise fluorescent powder and are selectively added with diffusion particles. The present invention prevents the phenomenon of color shift and the luminous efficiency degradation due to the fluorescent powder accelerated ageing because of closing to the LED chip.

16 Claims, 7 Drawing Sheets

LIGHT GUIDE PLATE AND BACKLIGHT MODULE

BACKGROUND OF THE INVENTION

1. Field of the Invention

The present invention generally relates to a LCD skill technology, and more particularly to a light guide plate and a backlight module utilizing the light guide plate.

2. Description of Prior Art

Because the liquid crystal itself of the LCD panel does not provide the characteristics of luminescence, a light source device, such as a backlight module is needed for the LCD panel for achieving the display effect. The function of the backlight module is to provide a surface light source fully brighten and uniformly distributed for the LCD panel.

In prior arts, the backlight module comprises a light source, a light guide plate and some other necessary portions. The function of the light guide plate is to guide the propagating direction of the light to allow the light uniformly emitted through the light-emitting surface of the light guide plate. The light source such as LED is utilized. The structure of an LED is shown in FIG. 1(a) and FIG. 1(b). The structure of the LED comprises a YAG fluorescent powder 10 and a blue light LED chip 20. Alternatively, the structure of the LED comprises RGB fluorescent powder 30 and a UV LED chip 40. The principles for generating white light are mainly categorized as follow four kinds: A. a blue light LED chip+yellow fluorescent powder (such as YAG); B. a blue light LED chip+yellow fluorescent powder+red fluorescent powder; C. a blue light LED chip+green fluorescent powder+red fluorescent powder; D. a UV LED chip+RGB fluorescent powder. Generally, the fluorescent powder is directly coated on the LED chip or uniformly distributed in the package material of the LED itself.

Moreover, the structure of a side light type LED backlight module is shown in FIG. 2: light of a plurality of white LED 110 is guided into a light guide plate 120 from the side thereof. The light propagates in the light guide plate 120 by total reflection. When the light is incident onto the screen dots 130, part of light is diffused by the diffusion particles on the screen dots 130 and emitted through the light-emitted surface over the light guide plate 120.

As aforementioned, the coating of the fluorescent powder in prior art has drawbacks below: First, the LED generates lots of heat in the luminous process. The heat accumulation leads to the fluorescent powder coating portion with higher temperature but the resistance of the fluorescent powder to high temperature is bad and then the ageing is accelerated; besides, the reflecting absorption loss of the reflecting absorption to light also degrades the luminous efficiency of the LED. Therefore, the LED with such coating has drawbacks of fast luminous efficiency degradation, large color shift as time and low luminous efficiency. Please refer to FIG. 3, which shows the lighting effect variation of a LED versus time according to prior art. The Y-axis indicates the luminous efficiency and the X-axis indicates the Celsius. The square spots represent the YAG fluorescent powder and the round spots represent the InGaN blue LED. As shown in FIG. 3, the bad condition that the luminous efficiency changes as time to such kind of LEDs and the high requirement of color in display area come as a paradox.

SUMMARY OF THE INVENTION

An objective of the present invention is to prevent the phenomenon of color shift and the luminous efficiency degradation due to the fluorescent powder accelerated ageing because of closing to the LED chip.

For realizing the aforesaid objective of the present invention, the present invention employs the skill solutions below:

A light guide plate comprises a bottom surface, a light incident surface and a light-emitting surface. The light-emitting surface and the bottom surface are positioned oppositely. The bottom surface comprises a plurality of screen dots. The light guide plate employs LEDs as a light source and light illuminated by the LED light source is incident through the light incident surface of the light guide plate. The screen dots comprise fluorescent powder.

The present invention also provides a backlight module comprising the light guide plate and a LED light source. The light guide plate comprises a bottom surface, a light incident surface and a light-emitting surface. The light-emitting surface and the bottom surface are positioned oppositely. The bottom surface comprises a plurality of screen dots. The LED light source is positioned opposing the light incident surface. The screen dots comprise fluorescent powder.

In one embodiment of the present invention, the LEDs are ultraviolet LEDs and the screen dots are in a single layer. The screen dot composition comprises a mixture of red fluorescent powder, green fluorescent powder and blue fluorescent powder.

Preferably, the screen dots further comprises diffusion particles.

In one embodiment of the present invention, the LEDs are blue LEDs and the screen dots are in a single layer. The screen dot composition comprises fluorescent powder and ink having diffusion particles.

Preferably, the fluorescent powder is yellow fluorescent powder; or a mixture of yellow fluorescent powder and red fluorescent powder; or a mixture of green fluorescent powder and red fluorescent powder.

In one embodiment of the present invention, the LEDs are blue LEDs and the screen dots are in a single layer. The screen dots are ink screen dots having diffusion particles and fluorescent powder screen dots.

Preferably, the ink screen dots having diffusion particles and the fluorescent powder screen dots are arranged alternately and the composition of the fluorescent powder screen dots comprises a mixture of red fluorescent powder and green fluorescent powder; or a mixture of yellow fluorescent powder and red fluorescent powder.

Preferably, the ink screen dots having diffusion particles and the fluorescent powder screen dots are arranged alternately line by line.

Preferably, sizes of the ink screen dots having diffusion particles are gradually larger from an incident side of the light source line by line.

Preferably, sizes of the fluorescent powder screen dots are gradually larger from an opposite side of an incident side of the light source.

Preferably, a screen dot line closest to an incident side of the light source is an ink screen dot line.

Preferably, a screen dot line closest to an opposite side of an incident side of the light source is a fluorescent powder screen dots line.

In one embodiment of the present invention, the screen dots are in double layers, wherein the fluorescent powder screen dots are in a first layer and the ink screen dots having diffusion particles are in a second layer.

In the present invention, the utilized fluorescent powder comprises aluminates (such as YAG), silicates, phosphates or nitrides.

The principle of generating white light in the present invention is Red+Green+Blue=White (R+G+B=W).

The fluorescent powder is not coated in the interior of the LEDs of the present invention.

The benefits of the present invention is: the fluorescent powder is not coated in the interior of the LEDs of the present invention and therefore, the fluorescent powder is not closing to the heat source to prevent the issues of color shift and the luminous efficiency degradation due to the fluorescent powder accelerated ageing; again, because the optical construction of the light guide plate is the primary factor that light emitting through the light-emitting surface over the light guide plate has to be diffused by the screen dot particles at least one time, therefore, with the fluorescent powder added to the diffusion particles, the fluorescent powder has diffusion effect itself in one hand, mixing the diffused light can be guaranteed for obtaining a uniform color. Accordingly, the light guide efficiency of the light guide plate can be improved further.

DETAILED DESCRIPTION OF THE INVENTION

Figure 1B:
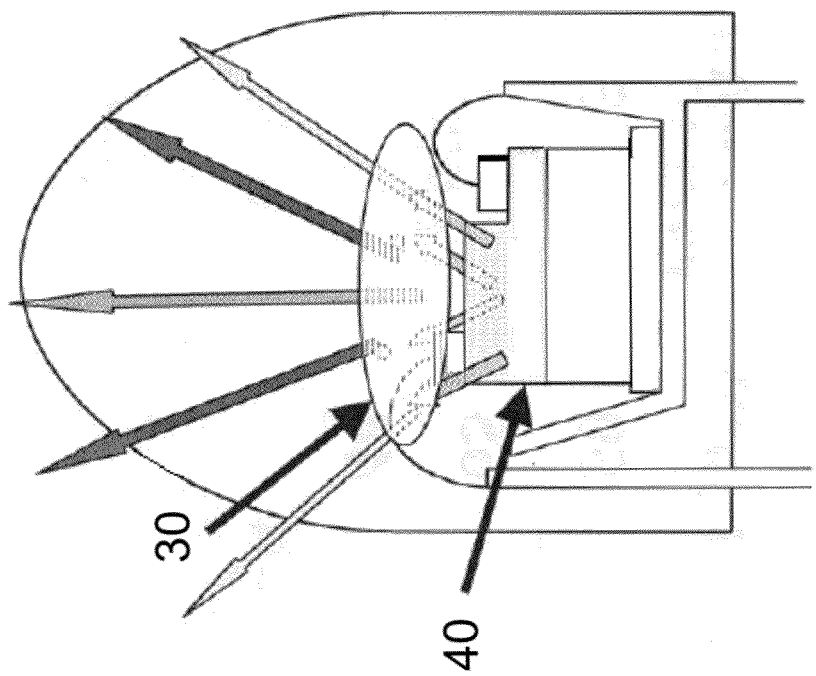
FIG. 1(a) and FIG. 1(b) show diagrams of a structure of a LED according to prior art.
Figure 1A:
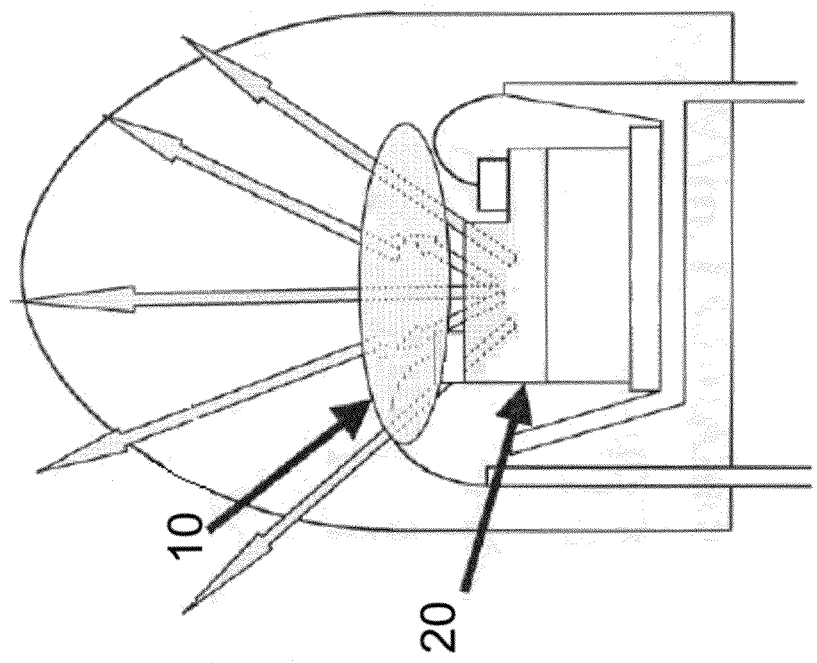
Figure 2:
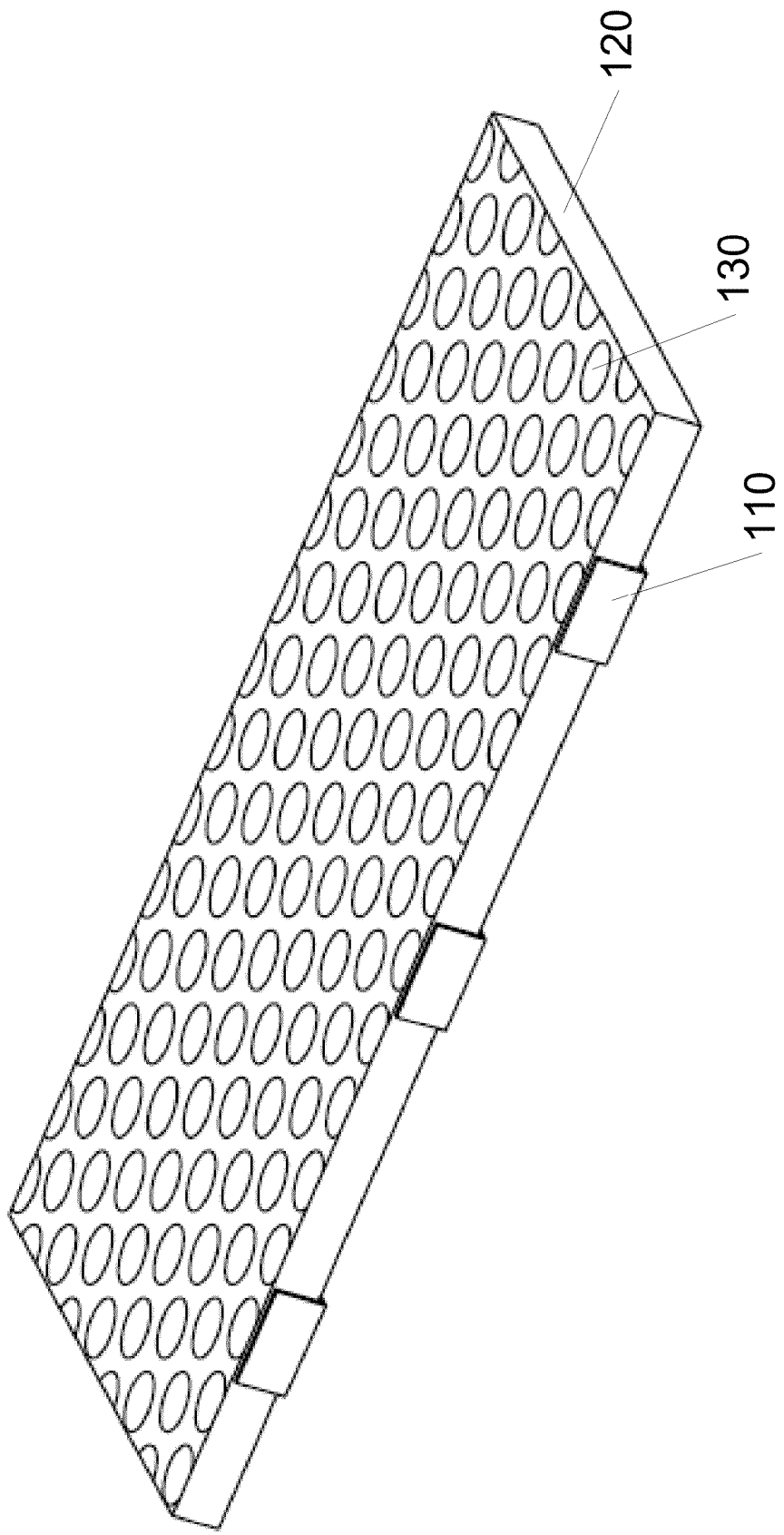
FIG. 2 shows a diagram of a side light type LED backlight module according to prior art.
Figure 3:
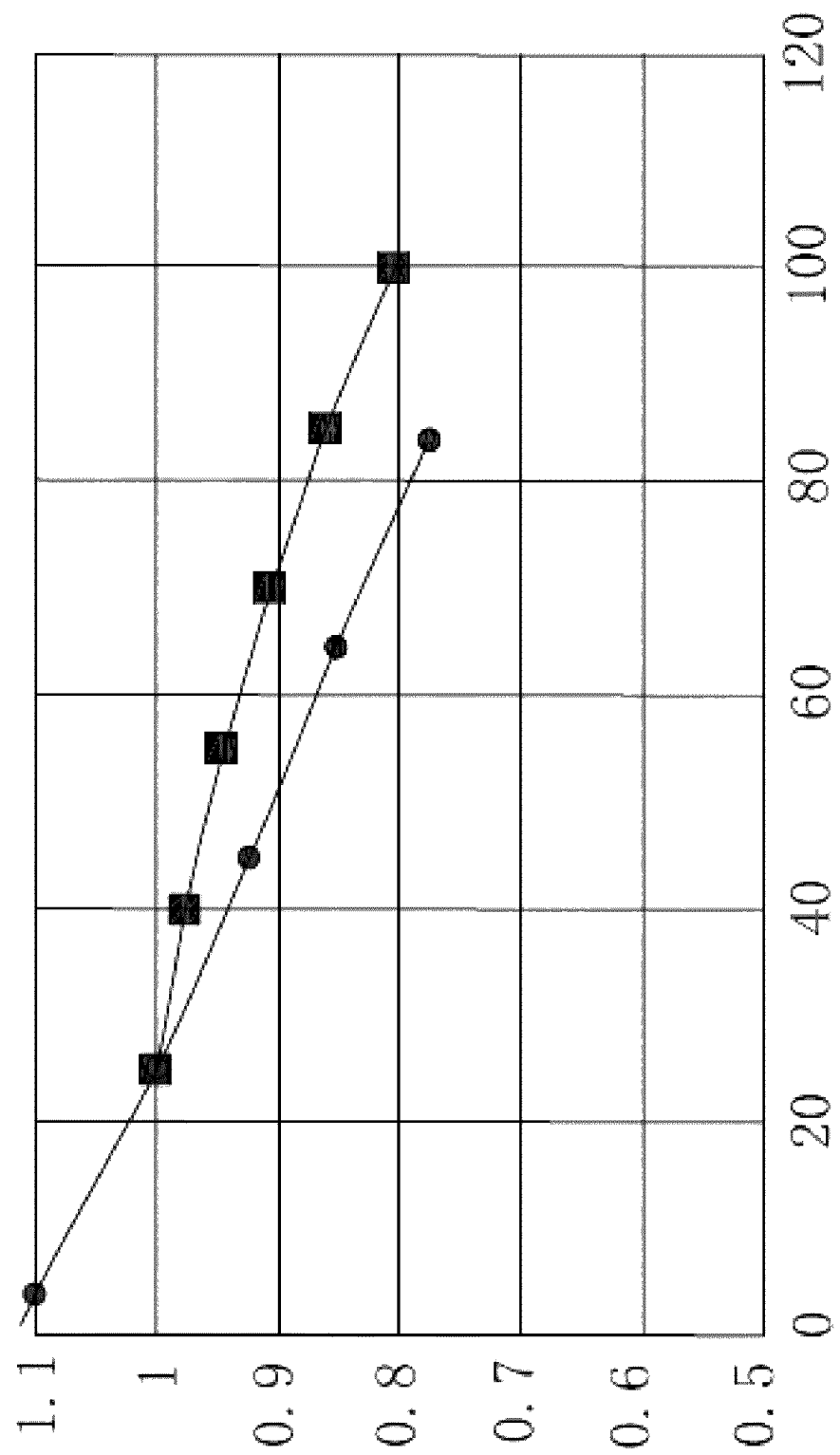
FIG. 3 shows diagram of a lighting effect variation a LED versus time according to prior art.
Figure 4:
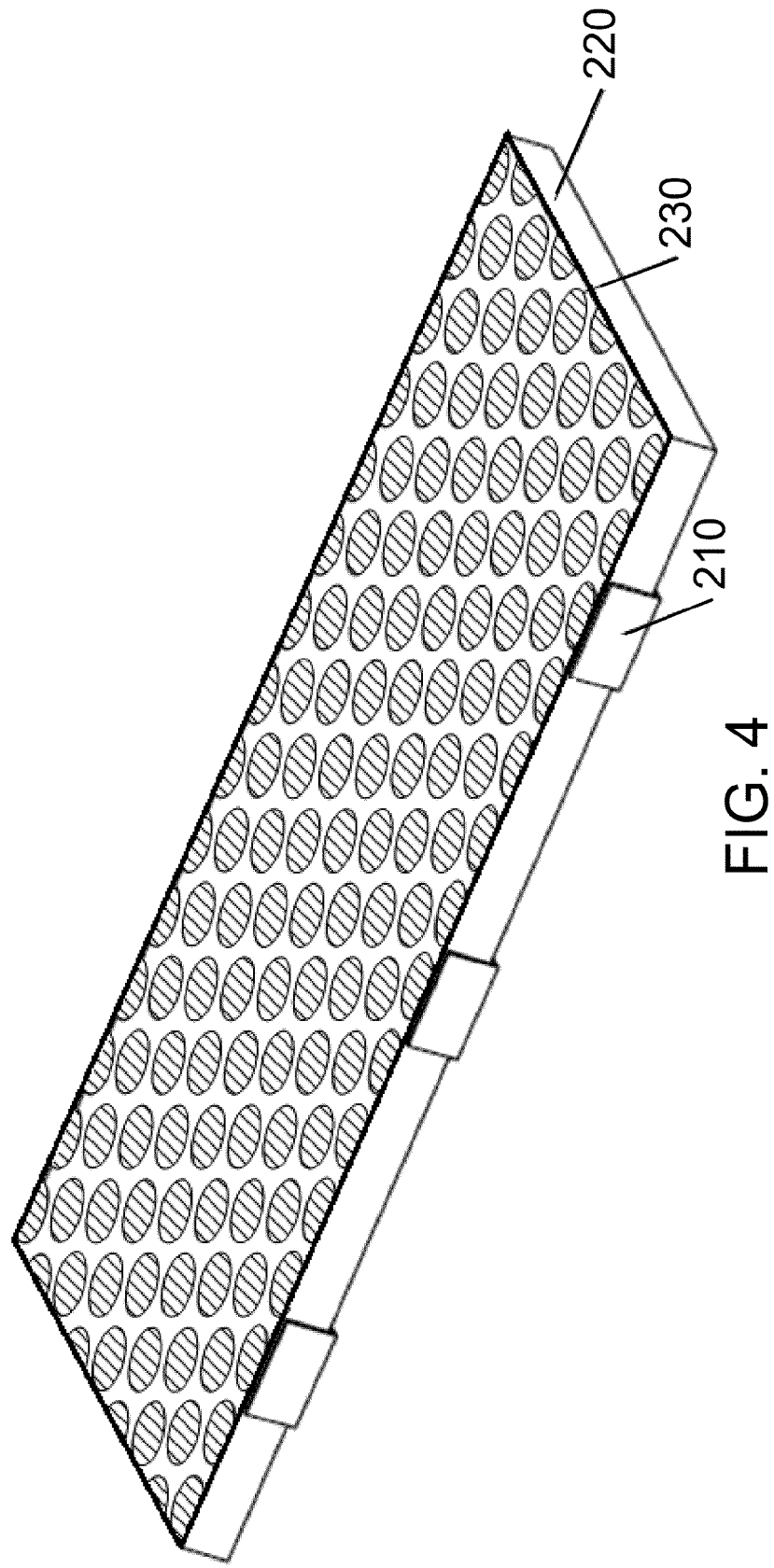
FIG. 4 shows a structure diagram of a side light type LED backlight module according to the present invention.

For a better understanding the aforementioned content of the present invention, preferable embodiments are illustrated in accordance with the attached figures for further explanation:

Shown in FIG. 4 is a structure diagram of a side light type LED backlight module according to the present invention. The side light type LED backlight module comprises a plurality of LED 210 and a light guide plate 220. The light guide plate 220 comprises a bottom surface, a light incident surface and a light-emitting surface. The light-emitting surface and the bottom surface are positioned oppositely. The bottom surface comprises a plurality of screen dots 230. Preferably, the light incident surface connects with the light-emitting surface. The LEDs 210 are positioned at the side of the light guide plate 220 and opposing the light incident surface. Light generated by the LEDs 210 is incident through the light incident surface of the light guide plate 220.

In the embodiment of the present invention, the fluorescent powder is not coated in the interior of the LEDs 210. The light generated by the LEDs 210 is emitting through the lens of the LEDs 210 itself one time directly. In a word, the LED chip and the fluorescent powder are separated away; meantime, the screen dot material on the screen dots 230 of the light guide plate 220 is changed from normal diffusion particles as material comprising the fluorescent powder and selectively added with diffusion particles. Thereby, blue light emitted or UV light by the LED 210 is incident to the screen dots 230 of the light guide plate 220 and is exciting the fluorescent powder and mixing to generate white light. Then, the white light is diffused and arrives the light-emitting surface over the light guide plate 220 to form a uniform surface light source.

The principle of generating white light in the present invention is: Red+Green+Blue=White. As considering the preferable embodiments, the present invention comprises four solutions below:

A. Blue LEDs are utilized. The screen dots comprise fluorescent powder and ink having diffusion particles.

To be specific, in this embodiment, the screen dots can comprise the fluorescent powder and the ink having diffusion particles and the fluorescent powder can be:

yellow fluorescent powder; or a mixture of yellow fluorescent powder and red fluorescent powder; or a mixture of green fluorescent powder and red fluorescent powder.

B. Ultraviolet LEDs are utilized. The screen dots comprise a mixture of red fluorescent powder, green fluorescent powder and blue fluorescent powder.

C. Blue LEDs are utilized. The screen dots are ink screen dots having diffusion particles and fluorescent powder screen dots arranged alternately. The composition of the fluorescent powder screen dots comprises:

a mixture of red fluorescent powder and green fluorescent powder; or a mixture of yellow fluorescent powder and red fluorescent powder.

D. Ultraviolet LEDs are utilized. The screen dots are in double layers. The fluorescent powder screen dots are in a first layer and comprising a mixture of red fluorescent powder, green fluorescent powder and blue fluorescent powder; the ink screen dots are in a second layer and are ink screen dots have diffusion particles. Reasonably, as the screen dots are in double layers, the blue LEDs also can be utilized. The yellow fluorescent powder screen dots can be in a first layer of the screen dots and the ink screen dots have diffusion particles are in a second layer of the screen dots.

In a preferable embodiment, the fluorescent powder utilized in the present invention comprises aluminate fluorescent powder, silicate fluorescent powder, phosphate fluorescent powder or fluorescent powder nitride.

Figure 5:
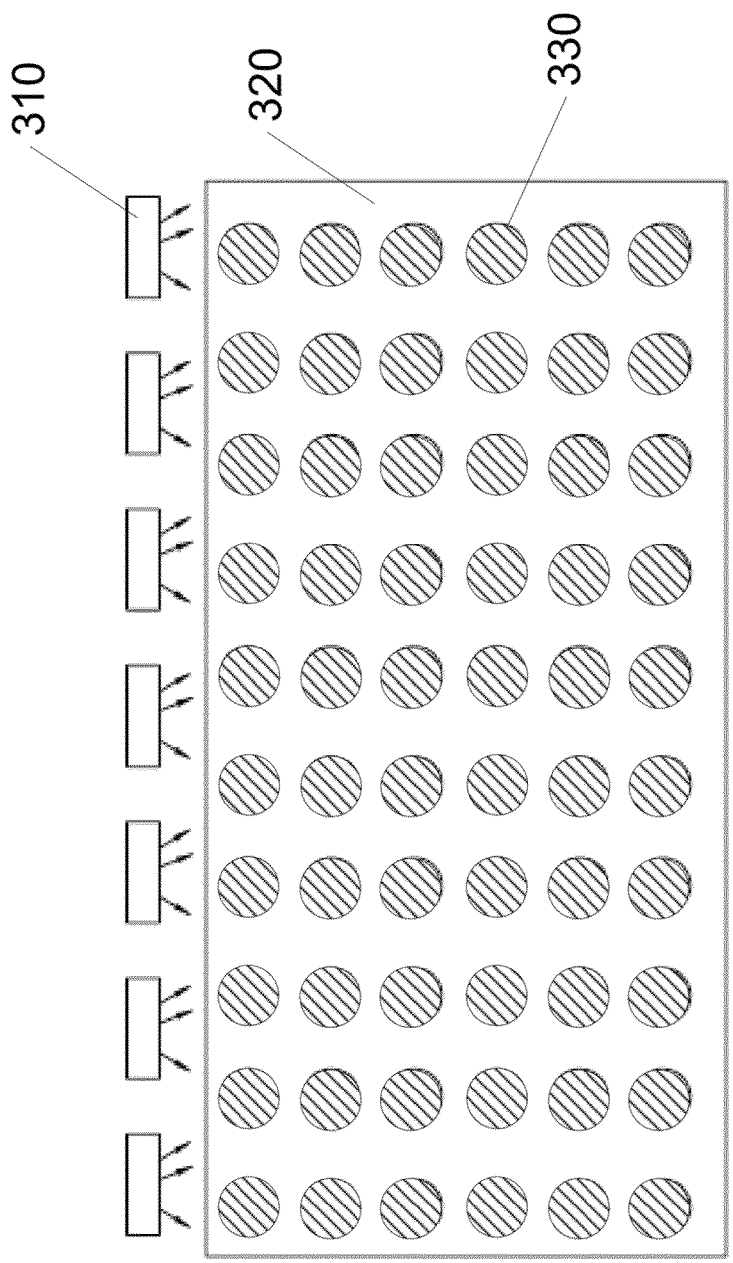
FIG. 5 shows a diagram of a solution that the screen dots made by mixing fluorescent powder and ink according to the first embodiment of the present invention.

Shown in FIG. 5 is a diagram of a solution that the composition of the screen dots made by mixing fluorescent powder and ink according to the first embodiment of the present invention, i.e. the aforementioned solution A. The side light type LED backlight module in FIG. 5 comprises LEDs 310, a light guide plate 320 and screen dots 330. The composition of the screen dots 330 can be yellow fluorescent powder and ink having diffusion particles; or yellow fluorescent powder, red fluorescent powder and ink having diffusion particles; or green fluorescent powder, red fluorescent powder and ink having diffusion particles.

In this embodiment that the ink and the fluorescent powder are mixed, as the fluorescent powder and the ink having diffusion particles are mixed to form the screen dots 330, the sizes of the screen dots 330 do not have specific requirements and can be designed according to the real demands. In this embodiment, the diameters of the screen dots 330 can be 0.2~0.4 mm. Specifically, the smallest screen dots can be 0.2 mm and generally 0.4 mm in a real screen print, the numbers of the screen dots are a lot. The structure of the screen dots in FIG. 5 is a simplified diagram.

Besides, as the ultraviolet LEDs are utilized as for the LEDs 310, the composition of the screen dots 330 can be the mixture of red fluorescent powder, green fluorescent powder and blue fluorescent powder, i.e. the aforementioned solution B. The ink having diffusion particles is not necessary for addition. The diameters and the arrangement of the screen dots 330 are same as the first embodiment and omitted here thereby.

Figure 6:
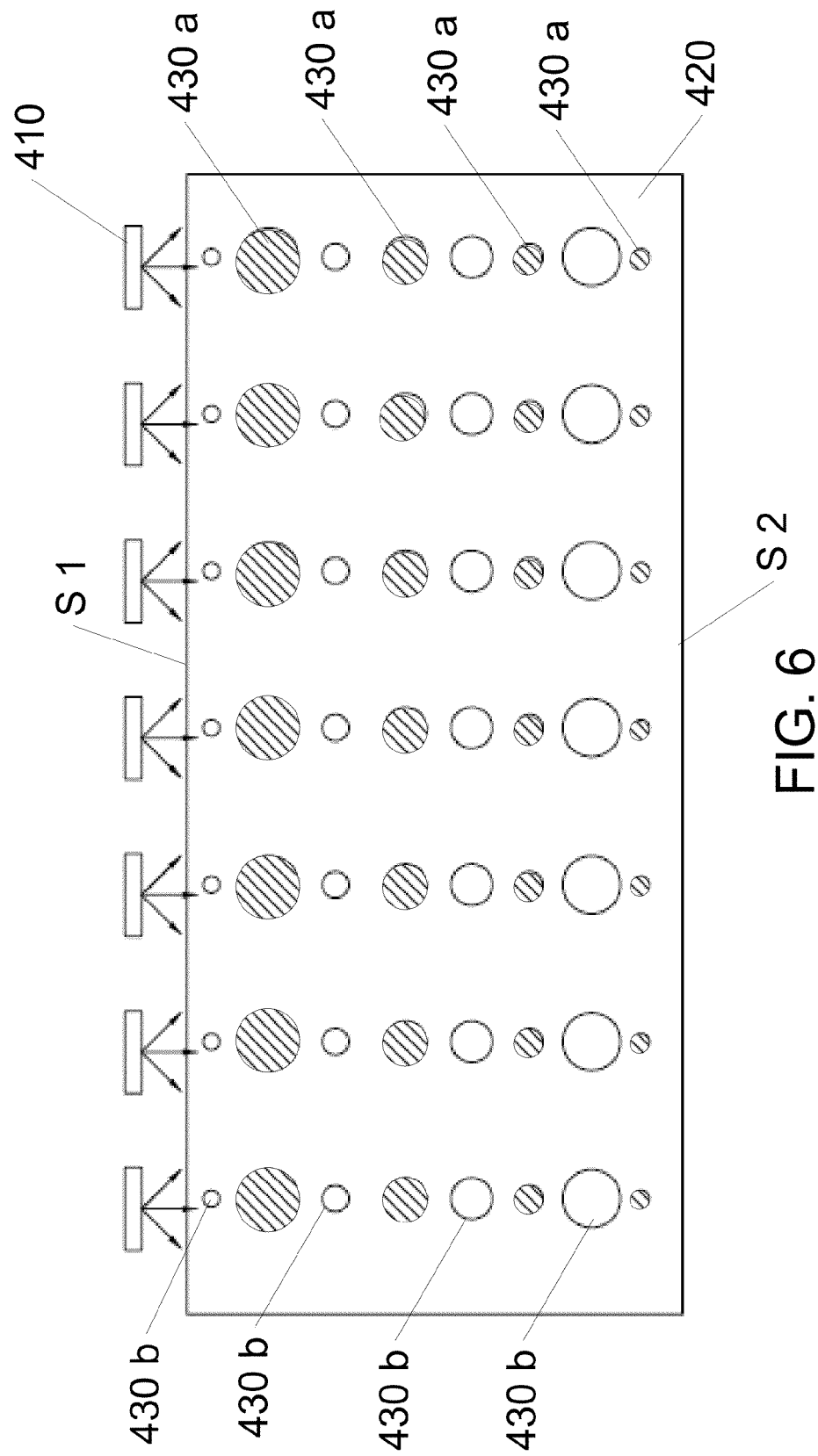
FIG. 6 shows a diagram of ink screen dots and fluorescent powder screen dots arranged alternately according to the second embodiment of the present invention.

Shown in FIG. 6 is a diagram of ink screen dots and fluorescent powder screen dots arranged alternately according to the second embodiment of the present invention, i.e. the aforementioned solution C. The side light type LED backlight module in FIG. 6 comprises LEDs 410, a light guide plate 420, fluorescent powder screen dots 430a and ink screen dots 430b. In this embodiment, the fluorescent powder screen dots 430a and the ink screen dots 430b having diffusion particles are arranged alternately line by line. In another word, a fluorescent powder screen dot line consisting of the fluorescent powder screen dots 430a and an ink screen dot line consisting of the ink screen dots 430b are arranged alternately. However, the arrangement is not limited thereto in real situations. The composition of the fluorescent powder screen dots 430a can be a mixture of red fluorescent powder and green fluorescent powder; or a mixture of yellow fluorescent powder and red fluorescent powder.

For the guarantee of uniform color, i.e. the ultimate light at the light emitting surface is white light, in this embodiment, the arrangement of the fluorescent powder screen dots 430a and the ink screen dots 430b is described below: The light generated by the light source LEDs 410 is incident from an incident side S1 of the light source. The ink screen dots 430b having diffusion particles and the fluorescent powder screen dots 430a are arranged alternately. The sizes of the ink screen dots 43b of the ink screen dot lines are gradually larger from an incident side S1 of the light source. The sizes of the ink screen dots 430b of the fluorescent powder screen dots 430a are gradually larger from the opposite side S2 of the incident side (the other side of the incident side) of the light source. The screen dot line closest to an incident side S1 of the light source comprises the ink screen dots 430b. The screen dot line closest to the opposite side S2 of the incident side of the light source comprises the fluorescent powder screen dots 430a.

Specifically, as the blue light is incident to the yellow fluorescent powder and transformed into yellow light, most of the yellow light is emitted outside the light guide plate 420 and few of the yellow light keeps propagating inside the light guide plate 420 until it is diffused out; as the blue light incident onto the ink screen dots 430, part of the blue light is diffused out of the light guide plate 420 and the rest part of the blue light keeps propagating inside the light guide plate 420; as the blue light is incident onto the empty places and will be totally reflected and then keeps propagating inside the light guide plate 420. As the transformed yellow light is incident onto the ink screen dots 430b, part of the yellow light is diffused out of the light guide plate 420 and the rest part of the yellow light keeps propagating inside the light guide plate 420; as the yellow light is incident onto the fluorescent powder screen dots 430a, part of the yellow light is diffused out of the light guide plate 420 and the rest part of the yellow light keeps propagating inside the light guide plate 420. As the blue light is incident onto the fluorescent powder screen dots 430a and then is emitted. Therefore, the uniform color at the light emitting surface of the light guide plate 420 shows because the constant ratio of the emitted blue light and the emitted yellow light. Near the incident side S1 of the light source, the larger sizes of the fluorescent powder screen dots 430a are needed for mixing to obtain white light because the entire incident light is blue light. As the propagation of the light in the light guide plate 420, the ratio of the yellow light in the light guide plate 420 increase constantly. Therefore, the ratio for transforming the blue light into yellow light gets smaller, i.e. to downsize the fluorescent powder screen dots 430a. The sizes of the ink screen dots 430b can be adjusted according to the brightness of the light guide plate 420.

Figure 7:
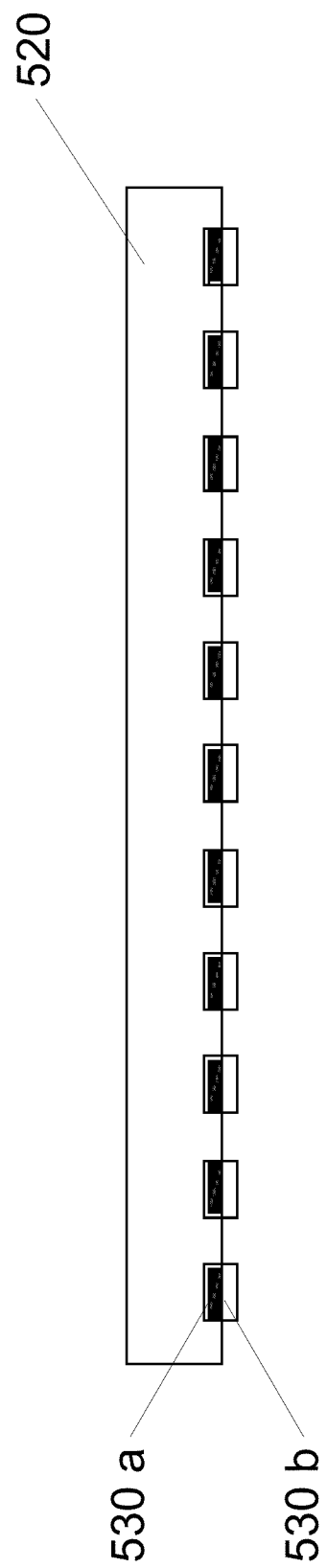
FIG. 7 shows a diagram of two-layer screen dots according to the third embodiment of the present invention.

Shown in FIG. 7 is a diagram of two-layer screen dots according to the third embodiment of the present invention, i.e. the aforementioned solution D. The side light type LED backlight module in FIG. 7 comprises a light guide plate 520, fluorescent powder screen dots 530a and ink screen dots 530b. These screen dots are in double layers. The fluorescent powder screen dots 530a coated by the fluorescent powder are positioned in the upper layer. The ink screen dots 530b coated by the diffusion particles are positioned in the lower layer. The fluorescent powder screen dots comprise a mixture of red fluorescent powder, green fluorescent powder and blue fluorescent powder.

Thus, the present invention separates the LEDs and the fluorescent powder with each other. The fluorescent powder does not have to be coated in the interior of the LEDs. Therefore, it can be prevented that the LDE color change due to the fluorescent powder accelerated ageing caused by the LED generating heat and the luminous efficiency degradation caused thereby. With the fluorescent powder added to the diffusion particles, the fluorescent powder has diffusion effect itself in one hand, mixing the diffused light can be guaranteed for obtaining a uniform color. Accordingly, the light guide efficiency of the light guide plate can be improved.

The sizes of the screen dots in the present invention can be changed according to the pitch size, panel size, print skill, ink variation and can be adjusted according to the design demands of real products. For example, as the LCD of the present invention is utilized for assembling a 42 inch side light type LED TV, the sizes of the screen dots in the light guide plate used for the backlight module are preferably in the range of 0.4 mm~4 mm.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A backlight module comprising a light guide plate and a LED light source, the light guide plate comprises a bottom surface, a light incident surface and a light-emitting surface, and the light-emitting surface and the bottom surface are positioned oppositely, and the bottom surface comprises a plurality of screen dots, and the LED light source is positioned opposing the light incident surface, characterized in that the screen dots comprises fluorescent powder, and diffusion particles.

2. The backlight module of claim 1, characterized in that the LEDs are ultraviolet LEDs, and the screen dots are in a single layer, and the screen dot composition comprises a mixture of red fluorescent powder, green fluorescent powder and blue fluorescent powder.

3. The backlight module of claim 1, characterized in that the LEDs are blue LEDs, and the screen dots are in a single layer, and the screen dot composition comprises fluorescent powder and ink having diffusion particles.

4. The backlight module of claim 3, characterized in that the fluorescent powder is:
    yellow fluorescent powder; or a mixture of yellow fluorescent powder and red fluorescent powder; or a mixture of green fluorescent powder and red fluorescent powder.

5. The backlight module of claim 1, characterized in that the LEDs are blue LEDs, and the screen dots are in a single layer, and the screen dots are ink screen dots having diffusion particles and fluorescent powder screen dots.

6. The backlight module of claim 5, characterized in that the ink screen dots having diffusion particles and the fluorescent powder screen dots are arranged alternately and the composition of the fluorescent powder screen dots comprises:

a mixture of red fluorescent powder and green fluorescent powder; or a mixture of yellow fluorescent powder and red fluorescent powder.

7. The backlight module of claim 6, characterized in that an arrangement of an ink screen dot line consisting of the ink screen dots having diffusion particles and a fluorescent powder screen dot line consisting of the fluorescent powder screen dots is alternate line by line.

8. The backlight module of claim 7, characterized in that sizes of the fluorescent powder screen dots are gradually larger from an opposite side of an incident side of the light source.

9. The backlight module of claim 7, characterized in that sizes of the ink screen dots having diffusion particles are gradually larger from an incident side of the light source.

10. The backlight module of claim 7, characterized in that a screen dot line closest to an incident side of the light source is an ink screen dot line.

11. The backlight module of claim 7, characterized in that a screen dot line closest to an opposite side of an incident side of the light source is a fluorescent powder screen dot line.

12. The backlight module of claim 1, characterized in that the screen dots are in double layers, wherein the fluorescent powder screen dots are in a first layer and the ink screen dots having diffusion particles are in a second layer.

13. A light guide plate, comprising a bottom surface, a light incident surface and a light-emitting surface, and the light-emitting surface and the bottom surface are positioned oppositely, and the bottom surface comprises a plurality of screen dots, and the light guide plate employs LEDs as a light source and light illuminated by the LED light source is incident through the light incident surface of the light guide plate, characterized in that the screen dots comprises fluorescent powder and diffusion particles.

14. The light guide plate of claim 13, characterized in that the LEDs are blue LEDs, and the screen dots are in a single layer, and the screen dot composition comprises fluorescent powder and ink having diffusion particles.

15. The light guide plate of claim 14, characterized in that an arrangement of an ink screen dot line consisting of the ink screen dots having diffusion particles and a fluorescent powder screen dot line consisting of the fluorescent powder screen dots is alternate line by line.

16. The light guide plate of claim 15, characterized in that sizes of the fluorescent powder screen dots are gradually larger from an opposite side of an incident side of the light source.

\* \* \* \* \*